(12) United States Patent
Mikajiri et al.

(10) Patent No.: US 7,733,543 B2
(45) Date of Patent: Jun. 8, 2010

(54) DOCUMENT ILLUMINATION APPARATUS, DOCUMENT READING APPARATUS AND IMAGE FORMING APPARATUS PERMITTING EFFICIENT COOLING

(75) Inventors: Susumu Mikajiri, Tokyo (JP); Hideaki Matsui, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1268 days.

(21) Appl. No.: 11/251,940

(22) Filed: Oct. 18, 2005

(65) Prior Publication Data

US 2006/0092617 A1   May 4, 2006

(30) Foreign Application Priority Data

| Oct. 18, 2004 | (JP) | ............................. 2004-303165 |
| Oct. 21, 2004 | (JP) | ............................. 2004-307395 |
| Apr. 27, 2005 | (JP) | ............................. 2005-130586 |
| Aug. 12, 2005 | (JP) | ............................. 2005-235076 |

(51) Int. Cl.
  *H04N 1/04* (2006.01)
(52) U.S. Cl. ........................ 358/475; 358/497; 358/474
(58) Field of Classification Search ................ 358/475, 358/505, 497, 494, 496, 474, 487, 506, 509; 250/232, 578.1, 234, 235, 239; 355/67–70; 399/212, 211, 220, 221

See application file for complete search history.

(56) References Cited

U.S. PATENT DOCUMENTS

| 3,532,424 | A | 10/1970 | Miles |
| 3,947,115 | A | 3/1976 | Hamaguchi |
| 4,092,066 | A | 5/1978 | Kawai |
| 4,095,881 | A | 6/1978 | Maddox |
| 4,939,546 | A | 7/1990 | Kasahara et al. |
| 5,075,720 | A | 12/1991 | Takeda et al. |

FOREIGN PATENT DOCUMENTS

| DE | 102 49 208 A1 | 3/2004 |
| EP | 0 901272 A2 | 3/1999 |
| JP | 11-196231 | 7/1999 |

OTHER PUBLICATIONS

U.S. Appl. No. 11/372,052, filed Mar. 10, 2006, Mikajiri et al.
D. W. Baxter, et al., "Document Illuminator Using Elliptic and Dichroic Reflectors", IBM Technical Disclosure Bulletin, XP-013065774, vol. 14, No. 11, Apr. 1972, pp. 3236 and 3237.

*Primary Examiner*—Cheukfan Lee
(74) *Attorney, Agent, or Firm*—Oblon, Spivak, McClelland, Maier & Neustadt, L.L.P.

(57) ABSTRACT

A document illumination apparatus includes a first light source configured to emit light. A first lower reflector is configured to reflect the light emitted from the first light source. A first upper reflector is configured to reflect the light reflected by the first lower reflector to illuminate a document. A first non-reflective area is disposed between the first lower and upper reflectors.

16 Claims, 8 Drawing Sheets

$y = D \cdot \cos\theta \cdot \sin\theta$ $= \frac{D}{2} \cdot 2 \cdot \sin\theta \cdot \cos\theta$ $= \frac{D}{2} \cdot \sin\theta$ ELLIPSE PASSES THROUGH A POINT $y > = \frac{D}{2} \cdot \sin 2\theta$

DOCUMENT ILLUMINATION APPARATUS, DOCUMENT READING APPARATUS AND IMAGE FORMING APPARATUS PERMITTING EFFICIENT COOLING

BACKGROUND OF THE INVENTION

1. Field of the Invention

The present invention relates to a document illumination apparatus, a document reading apparatus and an image forming apparatus, and more particularly to one or more of these apparatuses permitting efficient cooling of a lamp.

2. Discussion of the Related Art

It is known to use an illumination apparatus in a document reading apparatus of an image forming system, such as a copiers or a scanner. The illumination apparatus uses a fluorescent lamp as a light source to illuminate a document, so that the document can be read by the reading apparatus.

The fluorescent lamp is commonly a xenon lamp which has a high emission efficiency and relatively low power consumption. The xenon lamp has a wider light emitting area and generates a greater amount of light, although it has a lower brightness as compared to a halogen lamp.

The amount of light emitted by the lamp is proportional to an area of the glass tube coated with a fluorescent material. Thus, a relatively large xenon lamp, such as a xenon lamp having a size of 10 mm or more in diameter, is used to emit a large amount of light.

The known illumination apparatus suffer from the disadvantage that the large xenon lamp produces a relatively large amount of heat. High temperatures within the illumination apparatus adversely affect the longevity of the light source, and degrade other components of the illumination apparatus.

Further, the adverse effects caused by these high temperatures are compounded as illumination apparatuses are continually reduced in size. In order to make the illumination apparatuses more compact, it has been proposed to use more reflectors to provide the light path. However, the use of more reflectors increases the complexity of the illumination apparatuses, and it is more difficult and expensive to provide an accurate light path.

SUMMARY OF THE INVENTION

The present invention can provide a document illumination apparatus including a first light source configured to emit light. A first lower reflector is configured to reflect the light emitted from the first light source. A first upper reflector is configured to reflect the light reflected by the first lower reflector to illuminate a document. A first non-reflective area is disposed between the first lower and upper reflectors.

The present invention can provide a document illumination apparatus including a light source configured to emit light, and a reflector configured to reflect light emitted from the light source and to illuminate a document, the reflector having a shape of an ellipse. The ellipse is inclined by an angle θ so that one focal point of the ellipse is arranged on a center of the light source and another focal point of the ellipse is arranged to illuminate the document, such that the following formulas are satisfied;

$$\theta = \alpha + \beta + \gamma, \text{ and } \alpha \rangle \sin^{-1}\left(\frac{R}{D}\right),$$

where R is the radius of the light source, D is a distance between the two focal points of the ellipse, the angle θ is a lean angle of the ellipse to a plumb line to the document, α is an angle between a major axis of the ellipse and a nearest light ray to the light source, β is a light convergent angle, and γ is an angle between a farthest light ray from the light source and the plumb line to the document.

The present invention can provide a document illumination apparatus including a light source configured to emit light, and a reflector configured to reflect light emitted from the light source to illuminate a document, the reflector having a shape of an ellipse. One focal point of the ellipse is arranged on a center of the light source and another focal point is arranged to illuminate the document, such that the following formula is satisfied;

$$Y \geq \frac{D}{2} \cdot \sin 2\theta$$

where D is a distance between the two focal points of the ellipse, θ is a lean angle of the ellipse to a plumb line to the document and Y is a coordinate of an apex of a right triangle which is bounded by a line between the two focal points of the ellipse, the plumb line from the document and a horizontal line extending from the another focal point.

The present invention can provide a document illumination apparatus including a subassembly for emitting. A sub-assembly is used for reflecting the emitted light. A sub-assembly is used for reflecting the reflected light to illuminating a document. A non-reflective area is disposed between the sub-assemblies for reflecting light.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

In describing preferred embodiments of the invention shown in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, a document illumination apparatus according to an embodiment of the present invention is described.

Figure 1A:
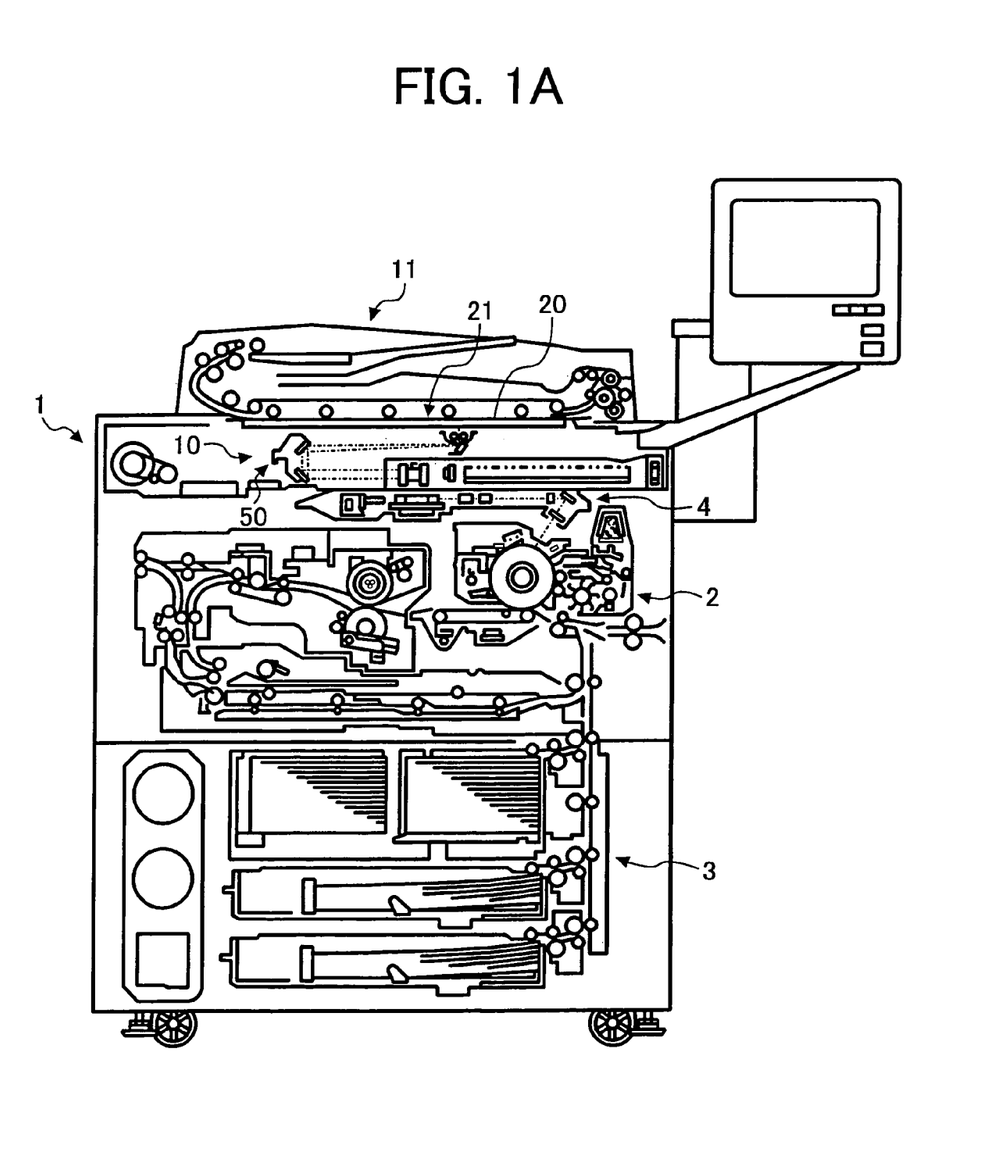
FIG. 1A is a side view an image forming apparatus having a document illumination apparatus according to the present invention.

FIG. 1A is a side view an image forming apparatus having a document illumination apparatus, in accordance with the present invention. The image forming apparatus includes a document reader 1, an image forming unit 2, a paper feed unit 3 and a writing unit 4. The document reader 1 includes a document illumination apparatus 10 and an automatic document feeder (ADF) unit 11. The image forming unit 2 can include other units used in image forming, such as a photo conductor 15, a charging unit, a developer unit, a transfer unit, and the like.

The paper feed unit 3 feeds papers or other types of recording sheets one after another to the image forming unit 2. A document is fed to a document table 20 by the ADF unit 11, and is read by the document illumination apparatus 10 arranged underneath the document table 20. Image information which is read by the document illumination apparatus 10 is detected and is converted to an electrical signal. The electrical signal is processed in a predetermined image forming manner. As a result, data for forming an image is determined from the electrical signal. Based on the data, a laser beam is directed to the photo conductor 15 from the writing unit 4 to form an electrostatic latent image on the photo conductor 15. In the image forming unit 2, the electrostatic latent image formed on the photo conductor 15 is developed as a toner image by applying toner from the developer unit. The toner image is transferred and fixed on the paper fed from the paper feed unit 3.

Figure 1B:
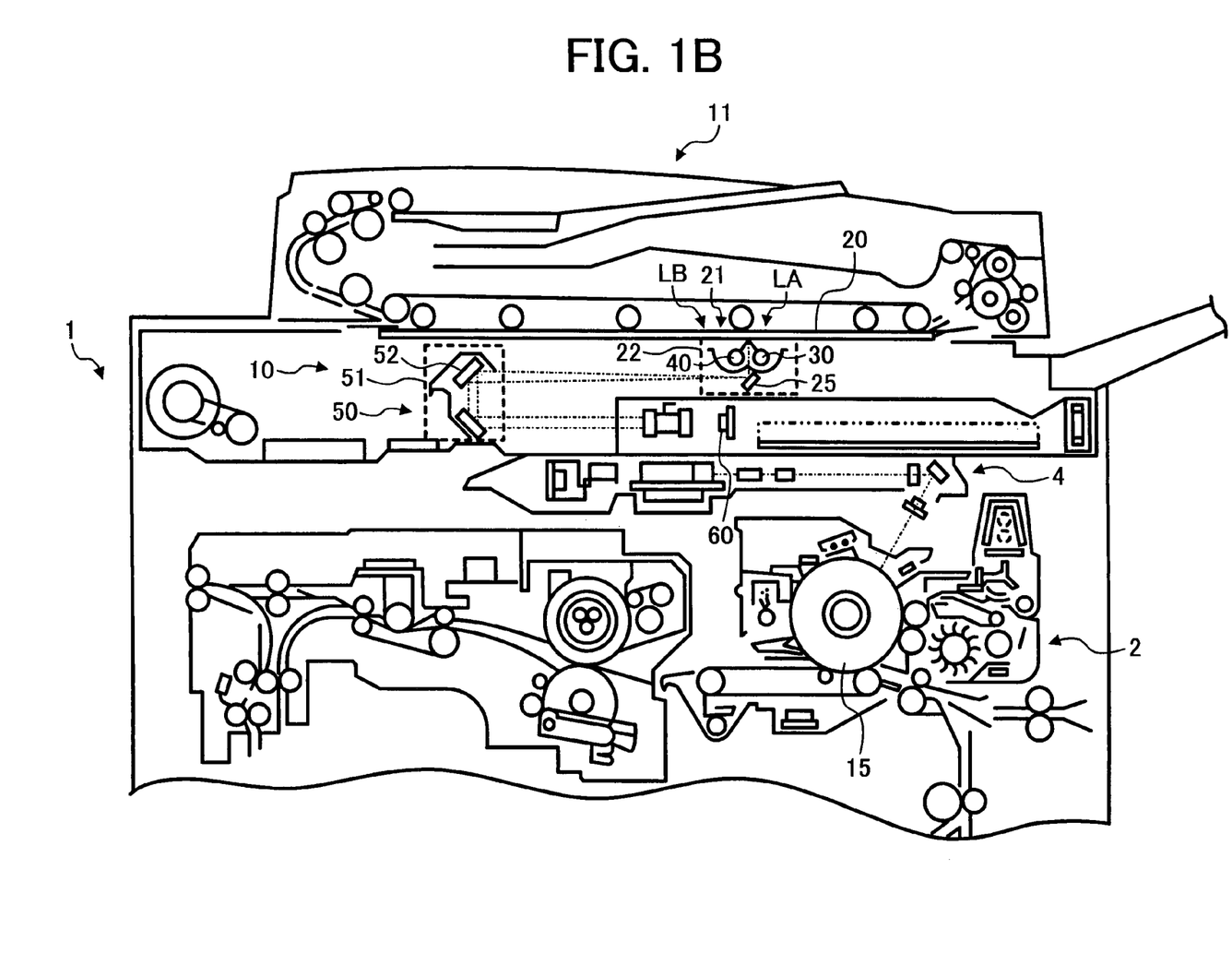
FIG. 1B is a detail view of a portion of the document illumination apparatus of FIG. 1A.

FIG. 1B is a detail view of a portion of the document illumination apparatus 10. The document illumination apparatus 10 includes the document table 20, a first running unit 21, a second running unit 50 and a reading plate 60. The first and second running unit 21 and 50 are configured to move in a predetermined horizontal direction. The reading plate 60 includes a CCD (charge-coupled device) to receive the image from the document.

The first running unit 21 includes a carriage 22, two lamps 30 and 40, reflection plates 31 and 41 and a mirror 25. The carriage 22 moves on a guide rail (not shown). The lamps 30 and 40 can be fluorescent lamp such as a xenon or halogen lamp, and are mounted on the carriage 22. The light emitted from the lamps is reflected by the reflection plates 31 and 41 to illuminate a surface of the document.

The second running unit 50 includes reflecting plates 52 on a carriage 51. The reflecting plates 52 are configured to reflect light rays reflected at the document in a predetermined direction. The light rays are reflected from the mirror 25 and are reflected by the reflecting plates 52 and then form an image of the document on the CCD. The image formed on the CCD is subject to image processing. The document illumination apparatus 10 converges the light emitted from the lamps 30 and 40 with the reflection plates 31 and 41.

Figure 2:
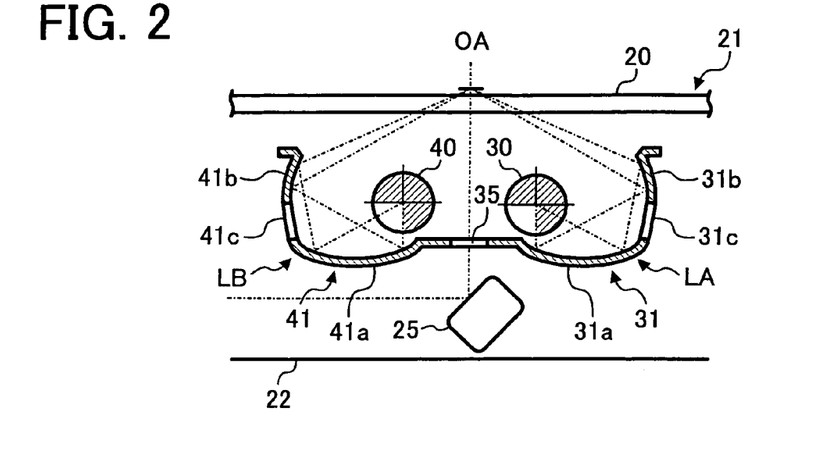
FIG. 2 is a side view of a first running unit of the document illumination apparatus.

FIG. 2 is a side view of a first running unit of the document illumination apparatus 10. The first running unit 21 includes a first light source unit LA, a second light source unit LB and the mirror 25. The light source units LA and LB include the lamps 30 and 40, lower reflectors 31a and 41a, and upper reflectors 31b and 41b, respectively. The lower and upper reflector 31a and 31b form the reflection plate 31 in the light source unit LA, and the lower and upper reflector 41a and 41b form the reflection plate 41 in the light source unit LB.

The lower reflectors 31a and 41a reflect the light from the lamps 30 and 40, respectively. The upper reflector 31b and 41b reflect the light reflected from the lower reflectors 31a and 41a, such that the light illuminates the document to be read OA. A smooth reflection surface is formed on each of the reflectors, for example, by a chemical polishing method, an electrolytic polishing method, a surface treatment such as plating, or alumite treatment through vapor deposition.

The lower and upper reflectors 31a and 31b are integral with one another and can be formed as a single unit. Similarly, the lower and upper reflector 41a and 41b are integral with one another and can be formed as a single unit. By this arrangement, it is possible to reduce the number of components, and ease and accuracy of assembly are increased.

A non-reflective area is arranged between the lower reflector 31a and the upper reflector 31b in the light source unit LA. An opening 31c can be formed in the non-reflective area. Similarly, in the light source units LB, a non-reflective area is arranged between the lower reflector 41a and the upper reflector 41b. An opening 41c can be formed in the non-reflective area. Thus, the non-reflective areas permit the lamps to be cooled by allowing the introduction of cool air and the escape of heated air from the openings 31c and 41c while the first running unit 21 moves in the predetermined running direction. The opening 31c and 41c can be arranged at a relatively same height to more easily permit air flow through, and therefore more efficiently cool, the light source units LA and LB.

In this embodiment, the light source units LA and LB are arranged symmetrically with respect to an optical axis of the light reflected to the document OA. The reflectors 31a, 31b, 41a and 41b can be integral with one another, such that the reflectors are formed in a single unit. By this arrangement, it is possible to reduce the number of components, and ease and accuracy of assembly are increased.

A light opening 35 is formed at a connection part between the first and the second reflectors 31a and 41a so that the reflected light rays pass to the mirror 25 located underneath the running unit 21. The light opening 35 is sized to prevent excess light from being incident on the mirror 25.

Figure 3:
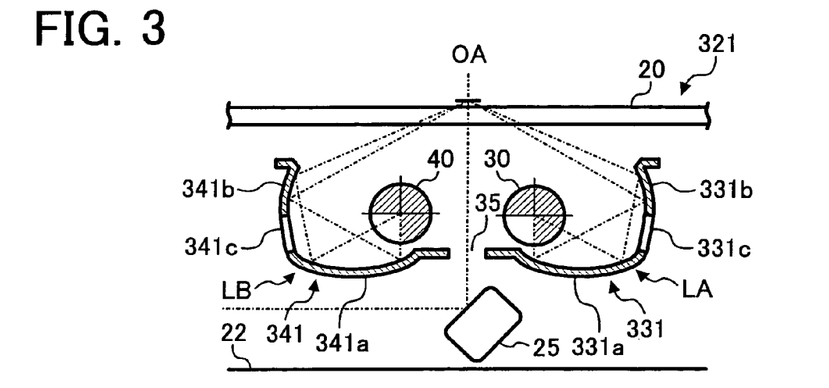
FIG. 3 is a side view of another embodiment of a first running unit.

FIG. 3 is a side view of another embodiment of a first running unit. The configuration of the first running unit 321 of FIG. 3 is similar to the first running unit 21 shown in FIG. 2. In the first running unit 321 a first light source unit LA is separately arranged from a second light source unit LB. The first and the second reflectors 331a and 331b are integral with one another and formed as a single unit, and the first and the second reflectors 341a and 341b are integral with one another and formed as a single unit. This arrangement provides advantages similar to those discussed above with respect to the arrangement shown in FIG. 2.

Figure 4:
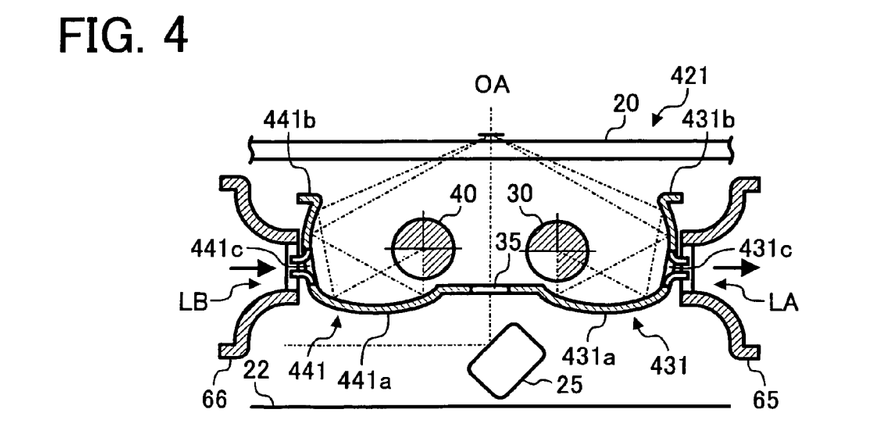
FIG. 4 is a side view of another embodiment of a first running unit.

FIG. 4 is a side view of another embodiment of a first running unit. The first running unit 421 includes an air duct 65 disposed outside of an opening 431c of a reflection plate 431, as well as an air duct 66 disposed outside of an opening 441c of a reflection plate 441. Each one of the air ducts 65 and 66 has an extended tapered shape. When the first running unit 421 moves in the lateral direction, cooling air flows into the first running unit 421 via the duct 66 and heated air flows out of the first running unit 421 via the duct 65.

As a result, it is possible to avoid problems caused by overheating the first running unit. Although FIG. 4 shows the ducts attached to the reflecting plates of the embodiment of FIG. 2, the ducts can be used with other type of reflecting plates, for example, the reflecting plates shown in FIG. 3.

Figure 5A:
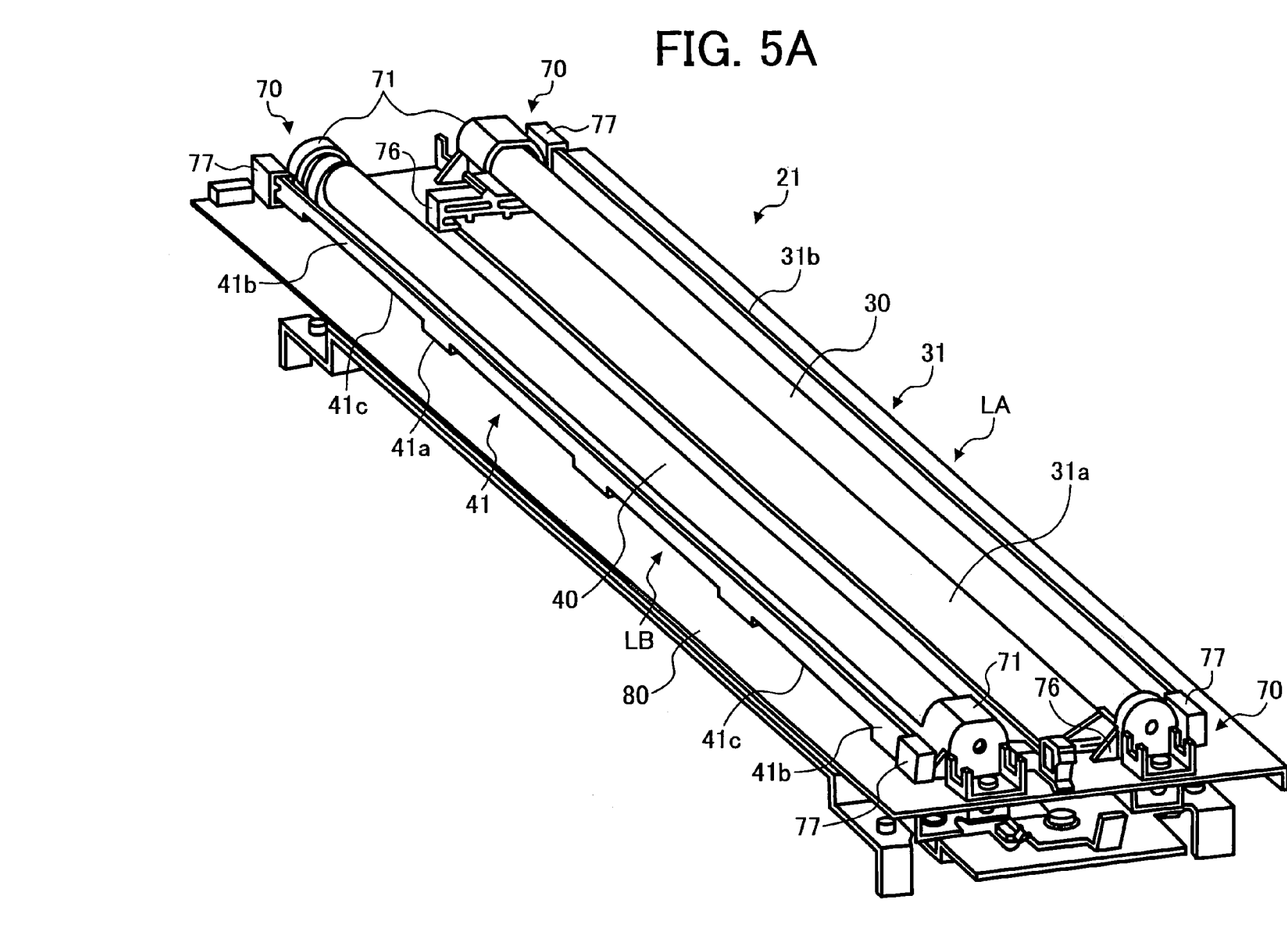
FIG. 5A is an isometric view of the first running unit of FIG. 2.
Figure 5B:
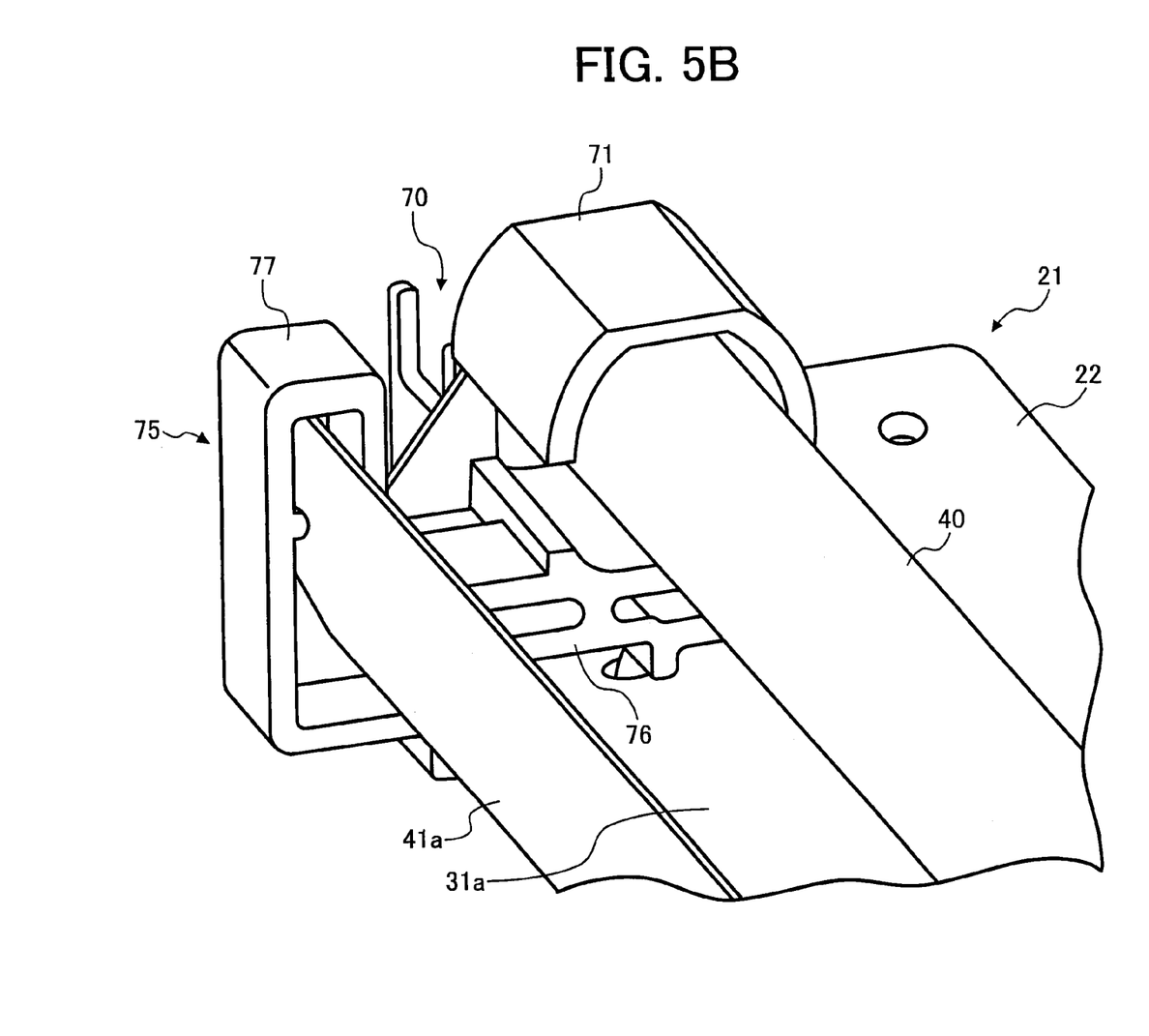
FIG. 5B is a detail view of a portion of the first running unit of FIG. 2.

FIG. 5A is an isometric view of the first running unit of FIG. 2. FIG. 5B is a detail view of a portion of the first running unit of FIG. 2. In this embodiment, the lamps 30 and 40 are strip-type light sources having electrodes at both of their respective ends.

As shown in FIG. 5B, a lamp-reflection plate holder 70, which holds the electrodes, is mounted on a carriage 22. The lamp 40 is held on the carriage 22 and is arranged symmetrically with respect to the lamp 30. Consequently, the lamps and the reflection plate holders are symmetrically arranged on the carriage 22.

The lamp-reflection plate holder 70 is electrically connected through electrodes arranged at both ends of the lamp 40. The lamp-reflection plate holder 70 further includes a lamp holder 71 and a reflection plate keeper 75 arranged adjacent and beside the lamp holder 71. The lamp holder 71 engages and mechanically holds the electrodes. The lamp holder 71 and the reflection plate keeper 75 can be formed as a single unit.

The lamp holder 71 includes a main body, terminals and lead wires. The main body is formed from a heat-resisting resin material. The terminals are arranged in the main body and the lead wires extend from the terminals to connect to a power supply. The lamp holder 71 also includes a fixed holder portion that fixes the electrode at one side of the lamp and a removable holder portion that is arranged at another side of the lamp, the holder portions configured for mounting and dismounting of the electrodes.

The reflection plate keeper 75 is a holding device having a removable (or fixable) configuration with both ends of a long side of the reflection plates 31 and 41, and the reflection plate keeper 75 is integral with the lamp holder 71 (i.e., formed as a single unit). The reflection plate keeper 75 includes a lower reflector keeper 76 and an upper reflector keeper 77.

The lower reflector keeper 76 includes a slot or slit to hold an end of the lower reflector 31a, and a slot or a slit to hold an end of the lower reflector 41a. Thus, the lower reflectors 31a and 41a are held by the lower reflector keeper 76 at both ends. Also, the upper reflector 31b and 41b are held by the upper reflector keeper 77 at both ends. The lower and upper reflector keepers 76 and 77 are integral with one another (i.e., formed as a single unit), and are integral with the lamp holder 71. By this arrangement, it is possible to reduce the number of components, and ease and accuracy of assembly are increased.

In order to provide a compact document illumination apparatus, it is important to optimize a positional configuration and determine shapes of the components to efficiently illuminate the document. In accordance with the following embodiments, a suitable positional relationship among a lamp, a reflection plate and a document table, as well as a shape of the reflection plate, is disclosed.

Figure 6:
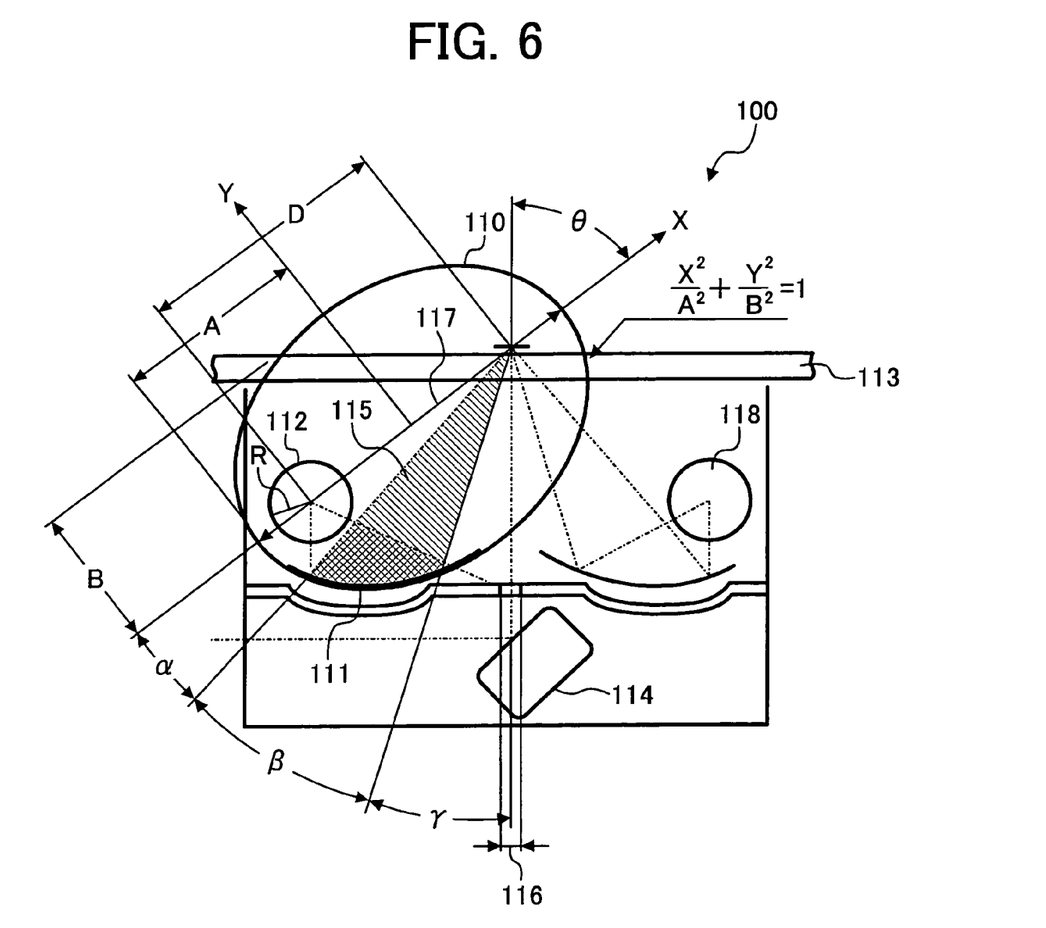
FIG. 6 is a side cross sectional view of another embodiment of a document illumination apparatus.

FIG. 6 is a side cross sectional view of another embodiment of a document illumination apparatus. The document illumination apparatus 100 includes two fluorescent lamps 112 and 118 and reflection plates. The reflection plate 111 is formed on a part along a surface of an ellipse 110.

A major axis 117 of the ellipse 110 described by a formula $$\frac{X^2}{A^2} + \frac{Y^2}{B^2} = 1$$

is tilted by an angle of θ to a plumb line to a document, the plumb line extending from a mirror 114. A center of a lamp having radius R is arranged at one of focal point of the ellipse 110. The focal point is a located at a far side of the document. Another focal point is arranged located on the document.

In this embodiment, α, β and γ are defined as follows: a is an angle between a major axis 117 of the ellipse 110 and a nearest light ray to the lamp 112; β is a light convergent angle; and γ is an angle between a farthest light ray from the lamp 112 and the plumb line to the document drawn from the mirror 114. The angle θ satisfies the formula:

$$\theta = \alpha + \beta + \gamma$$

and the angle α satisfies the formula:

$$\alpha \rangle \sin^{-1}\left(\frac{R}{D}\right)$$

where D is a distance between two focal points and R is radius of the lamp.

The fluorescent lamps 112 and 118 have lamp openings to output light. As shown in FIG. 6, the lamp opening of the fluorescent lamp 112 is arranged and oriented to face the opposite side to the document toward a lower place and also to face the plumb line extending to the document from the mirror 114. Thus, this configuration contributes to reduce an amount of unnecessary light for illuminating the document. Moreover, when the angle α is determined in accordance with the formula, the light reflected at the reflection plate is not limited by the lamp itself, so that the light is efficiently used to illuminate the document.

Figure 7:
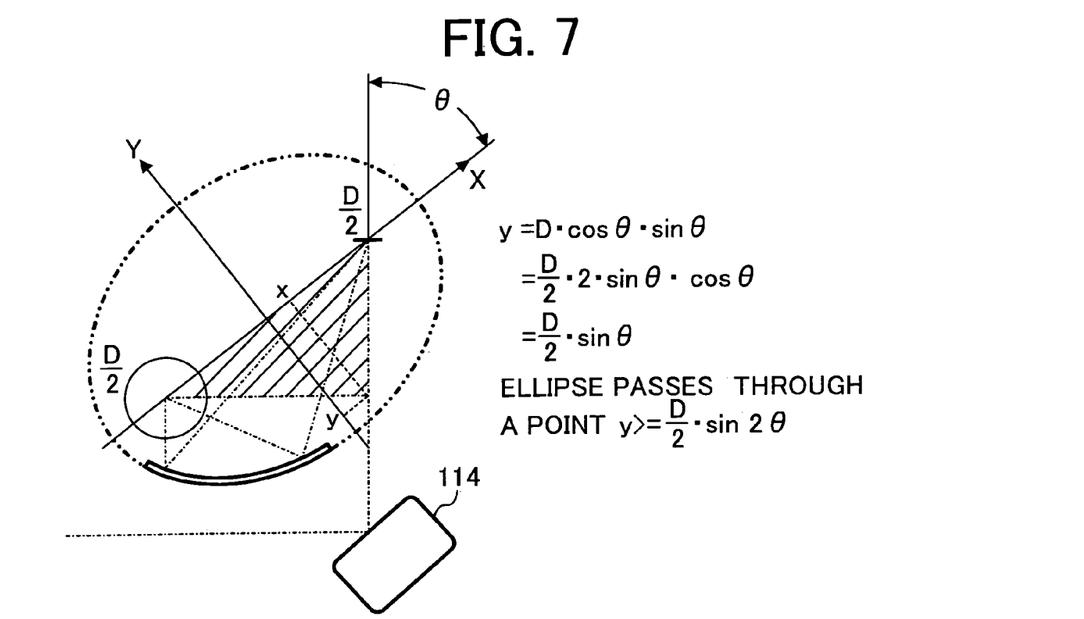
FIG. 7 is side view of an ellipse of a reflector of FIG. 6.

FIG. 7 is side view of an ellipse of a reflector of FIG. 6. A right triangle which is bounded by a line between the two focal points of the ellipse, the plumb line from the mirror 114 to the document and a horizontal line extending from the focal point is discussed. A coordinate Y of an apex of the right triangle is $$Y = D * \sin\theta * \cos\theta = \frac{D}{2} \cdot \sin 2\theta,$$

where D is a distance between the two focal points and θ is the lean angle of the ellipse to the plumb line to the document extending from the mirror 114. The X axis is defined so as to be in a direction of the major axis of the ellipse, and the Y axis is defined so as to be in a direction of the minor axis of the ellipse.

If the ellipse of the reflection plate satisfies a formula below passing through a point Y and the focal points are arranged on the center of the fluorescent lamp 112 and the document surface, an appropriate ellipse shape fitting in a relatively small space can be determined.

$$Y \geq \frac{D}{2} \cdot \sin 2\theta$$

Namely, if the relation among three factors, such as α, β and γ and a value Y which restricts a size of the ellipse satisfy the formulas, it is possible to determine an appropriate positional relationship between the fluorescent lamp 112 and the reflection plate 111 and a shape of the reflection plate 111. Based on this procedure, it is possible to efficiently illuminate the document and reduce the incidence of flare.

A shaded area 115 shown in FIG. 6 shows a range of light rays which is used to effectively illuminate the document. Because the lamp opening of the fluorescent lamp 112 is facing the opposite side to the document, light passing through the slit 116 and shining directly on the mirror 114 can adversely affect the reading performance of the document.

In this embodiment, the reflection plate 111 extends for a sufficient length to a direction of the plumb line to the document extending from a mirror 114 to avoid the direct incident light from the lamp 112 on the mirror 114. Moreover, the size of the reflection plate 111 is determined so as not to cover the slit 116. Thus, the light emitted from a cylindrical-shaped light source is converged by the reflection plate 111 and illuminates the document on the document table, and then the light reflected from the document shines through the slit 116.

Figure 8:
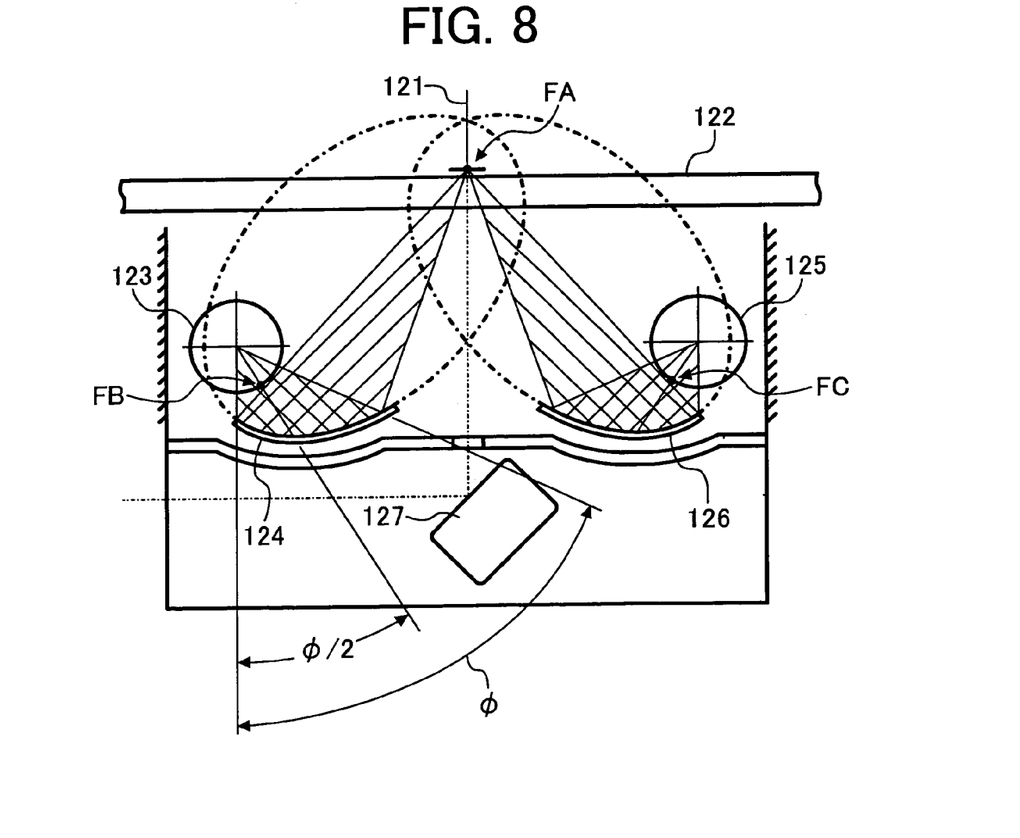
FIG. 8 is a side cross section view of another embodiment of a document illumination apparatus including two fluorescent lamps.

FIG. 8 is a side cross section view of another embodiment of a document illumination apparatus including two fluorescent lamps. Specifically, the illumination apparatus 100 includes two fluorescent lamps 123 and 125. In this embodiment, one focal point of an ellipse shaped reflection plate 124 is located at the document surface FA. However, another focal point is located at a cross point FB of the lamp 123 on a line extending from a center of the lamp to a middle of the lamp opening of the lamp with an angle φ, in contrast to the arrangement shown in FIG. 6.

Figure 9:
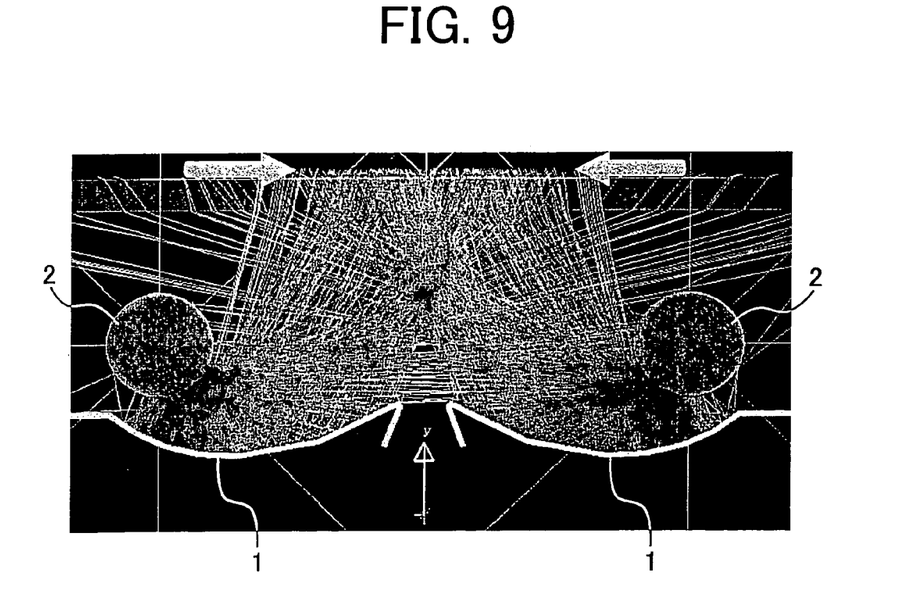
FIG. 9 is a side schematic view showing estimated beam lines of light of the document illumination apparatus of FIG. 6.

FIG. 9 is a side schematic view showing estimated beam lines of light of the document illumination apparatus of FIG. 6. In this embodiment, one focal point is located at the center of the lamp 112 and another focal point is located at the document surface.

Figure 10:
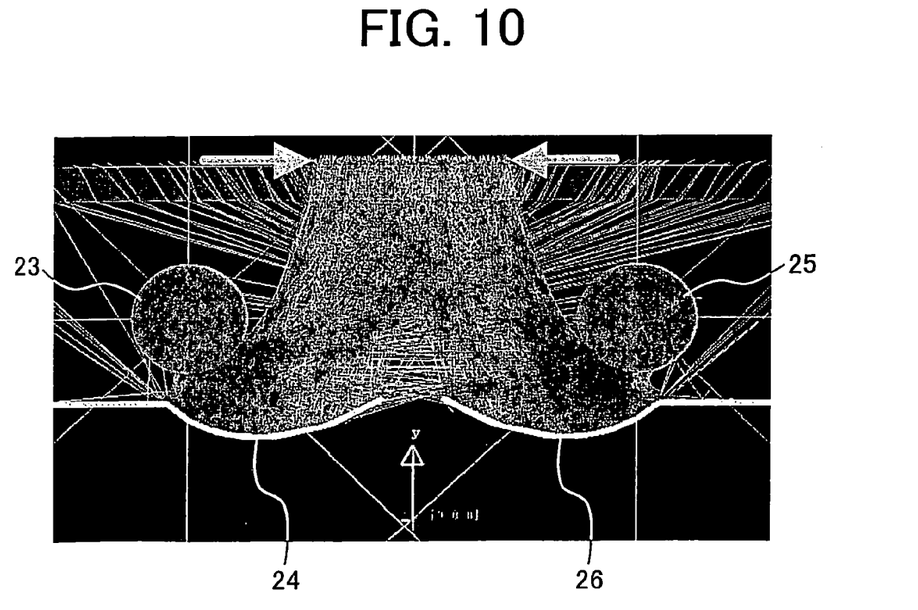
FIG. 10 is a side schematic view showing estimated beam lines of light of the document illumination apparatus of FIG. 8.

FIG. 10 is a side schematic view showing estimated beam lines of light of the document illumination apparatus of FIG. 8. In this embodiment, one focal point of an ellipse shaped reflection plate is located at a cross point FB of the lamp 123 on a line extending from the center of the lamp to the middle of the lamp opening of the lamp with the angle φ. Similarly, a focal point FC of another ellipse shaped reflection plate for lamp 125 is arranged in a similar manner.

As shown in FIG. 9 and FIG. 10, light emitted from the lamps 123 and 125 is converged at the document surface. By this arrangement, a more compact document illumination apparatus can be provided with a smaller illumination system. Additionally, pairs of lamps and reflection plates are arranged symmetrically with respect to the optical axis of the light reflected to the document OA so that a reading image area of the document is uniformly illuminated with the light from both of the lamps. Therefore, it is possible to avoid shading problems caused by curling of the document when the document is relatively small.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent applications, No. 2004-303165 filed on Oct. 18, 2004, No. 2004-307395 filed on Oct. 21, 2004, No. 2005-130586 filed on Apr. 27, 2005 and No. 2005-235076 filed on Aug. 12, 2005 in the Japan Patent Office, the entire contents of which are incorporated by reference herein.

What is claimed is:

1. A document illumination apparatus, comprising:
   a first light source configured to emit light;
   a first lower reflector configured to reflect the light emitted from the first light source;
   a first upper reflector configured to reflect the light reflected by the first lower reflector to illuminate a document;
   a light opening formed adjacent to a lower end portion of the first lower reflector and configured to allow light reflected by the document to pass to a mirror; and
   a first non-reflective area disposed separately from the light opening between the first lower and upper reflectors.

2. The document illumination apparatus according to claim 1,
   wherein the first non-reflective area comprises a first opening configured to permit air flow therethrough.

3. The document illumination apparatus according to claim 2, further comprising:
   a running unit configured to receive the first light source and the first lower and upper reflectors mounted thereon, the running unit configured to move horizontally.

4. The document illumination apparatus according to claim 3, further comprising:
   a duct connected to the running unit, the duct configured to permit air flow at least one of into and out of the running unit.

5. The document illumination apparatus according to claim 3, further comprising:
   a second light source configured to emit light;
   a second lower reflector configured to reflect the light emitted from the second light source;
   a second upper reflector configured to reflect the light reflected by the second lower reflector to illuminate the document; and
   a second non-reflective area disposed between the second lower and upper reflectors.

6. The document illumination apparatus according to claim 5,
   wherein the second non-reflective area comprises a second opening configured to permit air flow therethrough.

7. The document illumination apparatus according to claim 6,
   wherein the running unit is configured to receive the second light source and the second lower and upper reflectors mounted thereon.

8. The document illumination apparatus according to claim 6,
   wherein the first and second openings are arranged at a substantially same vertical elevation.

9. The document illumination apparatus according to claim 5,
   wherein the first and second light sources and the first and second reflectors are arranged symmetrically with respect to an optical axis of the light reflected to illuminate the document.

10. The document illumination apparatus according to claim 5, further comprising:

first and second holders configured to hold the first and second light sources, respectively; and first and second retainers configured to retain the first lower and upper reflectors and the second lower and upper reflectors, respectively.

11. The document illumination apparatus according to claim 10, wherein the first holder and first retainer are integral with one another.

12. The document illumination apparatus according to claim 1, wherein the first lower and upper reflectors are integral with one another.

13. A document reading apparatus comprising:

the document illumination apparatus according to claim 1.

14. An image forming apparatus comprising:

the document illumination apparatus according to claim 1.

15. A document illumination apparatus, comprising:

means for emitting light;

means for reflecting the emitted light;

means for reflecting the reflected light to illuminate a document;

a light opening formed adjacent to the means for reflecting the emitted light and configured to allow light reflected by the document to pass to a mirror; and a non-reflective area disposed separately from the light opening between the means for reflecting the emitted light and the means for reflecting the reflected light 16. The document illumination apparatus according to claim 15, further comprising:

means for introducing air, the means for introducing air disposed in the non-reflective area.

* * * * *